United States Patent
Sato et al.

(10) Patent No.: US 7,214,449 B2
(45) Date of Patent: May 8, 2007

(54) CATHODE ACTIVE MATERIAL AND NON-AQUEOUS ELECTROLYTE SECONDARY BATTERY

(75) Inventors: Takashi Sato, Fukushima (JP); Yoshikatsu Yamamoto, Fukushima (JP); Yosuke Hosoya, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/132,859

(22) Filed: May 18, 2005

(65) Prior Publication Data

US 2005/0266315 A1    Dec. 1, 2005

(30) Foreign Application Priority Data

May 26, 2004    (JP) ............................ P2004-156688

(51) Int. Cl.
*H01M 6/00* (2006.01)
(52) U.S. Cl. ................ 429/231.95; 429/218.1
(58) Field of Classification Search ............. 429/218.1, 429/231.95, 223, 229, 231.6, 231.5, 122; 423/420.2
See application file for complete search history.

(56) References Cited

U.S. PATENT DOCUMENTS 6,093,503 A * 7/2000 Isoyama et al. ............... 429/61
6,805,996 B2 10/2004 Hosoya
6,818,351 B2 * 11/2004 Sunagawa et al. ........ 429/231.3
2005/0058588 A1 * 3/2005 Kang et al. .............. 423/420.2

FOREIGN PATENT DOCUMENTS

JP    2001319652    11/2001
JP    2003242376    8/2003

* cited by examiner

*Primary Examiner*—Patrick Joseph Ryan
*Assistant Examiner*—Monique Wills
(74) *Attorney, Agent, or Firm*—Bell, Boyd & Lloyd LLP

(57) ABSTRACT

A cathode active material and non-aqueous electrolyte secondary battery. The non-aqueous electrolyte secondary battery includes a positive electrode and a negative electrode which are electrochemically doped and dedoped with lithium; and an electrolyte disposed between the positive electrode and the negative electrode. The positive electrode contains a cathode active material including a mixture of: a first cathode active material represented by a general formula: $Li_tCoM_sO_2$ where M represents a metal, $0 \leq s \leq 0.03$, and $0.05 \leq t \leq 1.15$; and a second cathode active material represented by a general formula: $Li_xNi_{(1-y-z)}Co_yMn_zA_aO_2$ where A represents a metal, $0.05 \leq x \leq 1.15$, $0.15 \leq y+z \leq 0.70$, $0.05 \leq z \leq 0.40$, and $0 \leq a \leq 0.10$.

15 Claims, 1 Drawing Sheet

CATHODE ACTIVE MATERIAL AND NON-AQUEOUS ELECTROLYTE SECONDARY BATTERY

CROSS REFERENCES TO RELATED APPLICATIONS

This application claims priority to Japanese Patent Document No. 2004-156688, filed on May 26, 2004 with the Japanese Patent Office, which disclosure in its entirety is hereby incorporated by reference.

BACKGROUND OF THE INVENTION

The present invention relates to a cathode active material containing a lithium composite oxide and a non-aqueous electrolyte secondary battery using the cathode active material in a positive electrode.

In recent years, as the semiconductor integration technique is advanced, various electronic devices, such as portable phones and laptop computers, are being reduced in size and weight. For this reason, as a portable power source for these electronic devices, there is desired a high performance secondary battery which is small in size and lightweight and which has a long life. As examples of secondary batteries meeting the demands, there can be mentioned nickel-hydrogen batteries, nickel-cadmium batteries, and lithium ion secondary batteries, and especially lithium ion secondary batteries have a voltage and an energy density as high as those of a 4-V grade battery, and hence can be mounted on an electronic device causing large power consumption. Thus, the lithium ion secondary batteries are mounted on portable electronic devices which primary batteries cannot deal with.

A feature of the lithium ion secondary battery resides in that a positive electrode having a high oxidation-reduction potential and a negative electrode having a low oxidation-reduction potential are combined to achieve a large capacity, i.e., large energy density, as compared to those of other batteries. Many electronic devices are actually used not only in an environment at room temperature but also in environments at temperatures in a wide range of from a low temperature to a high temperature, and the energy density varies depending on the way of using the device. In addition, when discharging at a large current is conducted, the quantity of electricity which can be taken out is reduced, and the voltage is also lowered due to the internal resistance.

In the lithium ion secondary battery, as a cathode active material, a lithium-cobalt composite oxide is mainly used (see, for example, Japanese Patent Application Publication No. 2003-242976 and Japanese Patent Application Publication No. 2001-319652). The reason for this is that the lithium-cobalt composite oxide has advantages in that the average discharge potential is high, and the like.

However, the lithium-cobalt composite oxide has problems in that the cycle characteristics are poor, and that the voltage is markedly lowered when discharging at a large output is conducted at a low temperature, for example, when a personal computer is used in a cold district, the computer cannot be started up due to a lack of the output of the power source.

Recently, as the application of the lithium ion battery is expanded, not only the further improvement of the cycle characteristics but also the increase of the output at low temperatures are demanded, and therefore a non-aqueous electrolyte battery excellent in both cycle characteristics and low-temperature load characteristics is desired.

It is desirable to provide a cathode active material and a non-aqueous electrolyte secondary battery, which are excellent in both cycle characteristics and low-temperature load characteristics.

SUMMARY OF THE INVENTION

The present invention relates to a cathode active material containing a lithium composite oxide and a non-aqueous electrolyte secondary battery using the cathode active material in a positive electrode. According to an embodiment of the present invention, there is provided a cathode active material including a mixture of:

a first cathode active material represented by a general formula: $Li_tCoM_sO_2$ (wherein M represents a metal, $0 \leq s \leq 0.03$, and $0.05 \leq t \leq 1.15$); and a second cathode active material represented by a general formula: $Li_xNi_{(1-y-z)}Co_yMn_zA_aO_2$ (wherein A represents a metal, $0.05 \leq x \leq 1.15$, $0.15 \leq y+z \leq 0.70$, $0.05 \leq z \leq 0.40$, and $0 \leq a \leq 0.10$).

According to another embodiment of the present invention, there is provided a non-aqueous electrolyte secondary battery including a positive electrode and a negative electrode which are electrochemically doped and dedoped with lithium, and an electrolyte disposed between the positive electrode and the negative electrode, wherein the positive electrode contains a cathode active material including a mixture of:

a first cathode active material represented by a general formula: $Li_tCoM_sO_2$ (wherein M represents a metal, $0 \leq s \leq 0.03$, and $0.05 \leq t \leq 1.15$); and a second cathode active material represented by a general formula: $Li_xNi_{(1-y-z)}Co_yMn_zA_aO_2$ (wherein A represents a metal, $0.05 \leq x \leq 1.15$, $0.15 \leq y+z \leq 0.70$, $0.05 \leq z \leq 0.40$, and $0 \leq a \leq 0.10$).

In an embodiment, it is preferred that the content of the second cathode active material in the mixture of the first and second cathode active materials is in the range of from 10 to 40% by weight. In an embodiment, it is preferred that the second cathode active material has a specific surface area in the range of from 0.2 to 1.5 $m^2/g$. In an embodiment, it is preferred that the positive electrode has an electrode volume density in the range of from 3.1 to 3.7 $g/cm^3$. In the first and second embodiments, it is preferred that the metal M and/or A is at least one member selected from Mg and Al.

In the present invention in an embodiment, by virtue of the cathode active material comprising a mixture of the first cathode active material represented by a general formula: $Li_tCoM_sO_2$ (wherein M represents a metal, $0 \leq s \leq 0.03$, and $0.05 \leq t \leq 1.15$) and the second cathode active material represented by a general formula: $Li_xNi_{(1-y-z)}Co_yMn_zA_aO_2$ (wherein A represents a metal, $0.05 \leq x \leq 1.15$, $0.15 \leq y+z \leq 0.70$, $0.05 \leq z \leq 0.40$, and $0 \leq a \leq 0.10$), not only can the lowering of the capacity after repeating a plurality of cycles be suppressed, but also the lowering of the voltage when discharging at a large output is conducted at a low temperature can be suppressed.

As mentioned above, according to an embodiment the present invention, a non-aqueous electrolyte secondary battery excellent in both cycle characteristics and low-temperature heavy load characteristics may be realized.

Additional features and advantages of the present invention are described in, and will be apparent from, the following Detailed Description of the Invention and the figures.

DETAILED DESCRIPTION OF THE INVENTION

Figure 1:
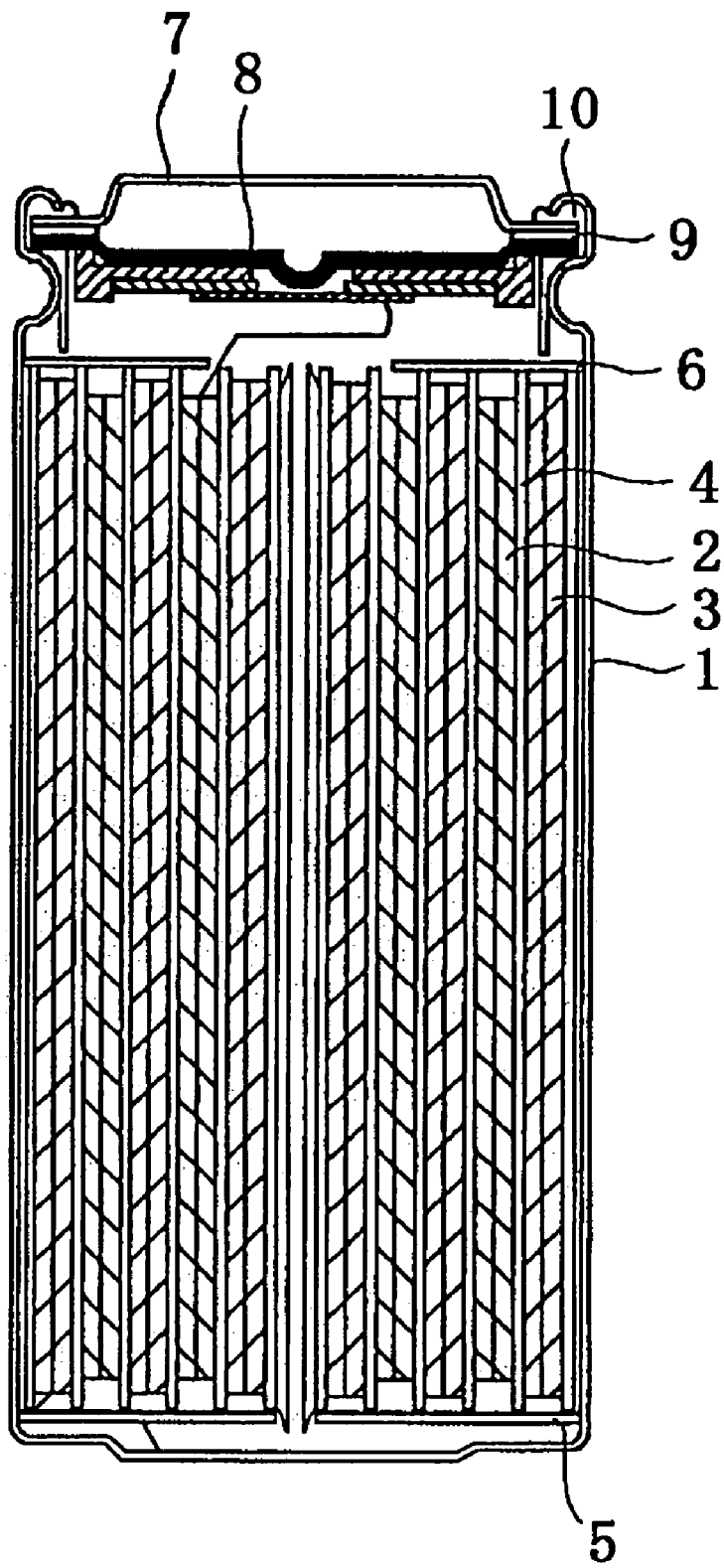
FIG. 1 is a cross-sectional view showing an example of the construction of a non-aqueous electrolyte secondary battery according to an embodiment of the present invention.

The present invention relates to a cathode active material containing a lithium composite oxide and a non-aqueous electrolyte secondary battery using the cathode active material in a positive electrode.

Various, embodiments of the present invention will be described with reference to drawings as described below in greater detail. FIG. 1 is a cross-sectional view showing an example of the construction of a non-aqueous electrolyte secondary battery according to an embodiment of the present invention.

As shown in FIG. 1, this non-aqueous electrolyte secondary battery is of a so-called cylinder type, and has a spirally-wound electrode structure in a battery casing 1 in a substantially hollow cylindrical form. The spirally-wound electrode structure includes a strip-form positive electrode 2 having a cathode active material and a strip-form negative electrode 3 having an anode active material, which have disposed therebetween a separator 4 permeable to ions and are together spirally wound many times. The battery casing 1 is made of, for example, nickel-plated iron, and has one end closed and another end opened. In the battery casing 1, a pair of insulating plates 5, 6 are placed so that they have both ends of the spirally-wound electrode structure disposed between the insulating plates.

To the battery casing 1 at the opened end are fitted a battery lid 7, a safety valve 8 formed inside of the battery lid 7, and a positive temperature coefficient (hereinafter, referred to as "PTC") element 9 by caulking through a sealing gasket 10, so that the battery casing 1 is closed. The battery lid 7 is made of, for example, the same material as that for the battery casing 1. The safety valve 8 is electrically connected to the battery lid 7 through the PTC element 9, and has a so-called current cut-out mechanism for cutting out the electrical connection between the battery lid 7 and the spirally-wound electrode structure when the pressure in the battery is increased to a predetermined value or higher due to the occurrence of internal short-circuiting or exposure to heat from an external heat source. The PTC element 9 increases the resistance to restrict the current when the temperature rises, preventing abnormal heat generation due to the large current. The sealing gasket 10 is made of, for example, an insulating material, and has asphalt coated on the surface. Positive Electrode.

The positive electrode 2 includes a strip-form current collector for positive electrode, and cathode active material layers formed on both surfaces of the current collector for positive electrode. The current collector for positive electrode is a metallic foil made of, for example, aluminum, stainless steel, or nickel. The cathode active material layer is made of, for example, a cathode active material, a conductor, and a binder.

As the binder, for example, polytetrafluoroethylene, polyvinylidene fluoride (PVdF), or polyethylene can be used. As the conductor, for example, carbon powder of graphite or carbon black can be used.

The cathode active material includes a mixture of a first cathode active material which is a lithium-cobalt composite oxide, and a second cathode active material which is a lithium-transition metal composite oxide. Each of the first and second cathode active materials has a crystal structure of, for example, a hexagonal crystal-system layer structure. The first cathode active material is a lithium composite oxide represented by a general formula: $Li_tCoM_sO_2$ (wherein M represents a metal, $0 \leq s \leq 0.03$, and $0.05 \leq t \leq 1.15$). The second cathode active material is a lithium composite oxide represented by a general formula: $Li_xNi_{(1-y-z)}Co_yMn_zA_aO_2$ (wherein A represents a metal, $0.05 \leq x \leq 1.15$, $0.15 \leq y+z \leq 0.70$, $0.05 \leq z \leq 0.40$, and $0 \leq a \leq 0.10$). It is preferred that each of the metals M and A is at least one element selected from Mg and Al.

In the general formula: $Li_tCoM_sO_2$, t is changed depending on the charged or discharged state, and, when t is less than 0.05 in the charged state, the structure of crystal phase is likely to break during the repetition of the charge/discharge cycle and the like, and part of the crystal phase loses reversibility, so that the charge/discharge capacity is disadvantageously lowered. On the other hand, when t is larger than 1.15 in the discharged state, the state of the mixture in the positive electrode is poor, or Li which does not contribute to the charge/discharge reaction is increased, so that the volume energy density is disadvantageously lowered markedly. Therefore, it is preferred that t falls in the range: $0.05 \leq t \leq 1.15$.

In the general formula: $Li_tCoM_sO_2$, when s is larger than 0.03, the initial capacity is disadvantageously lowered. Therefore, it is preferred that s falls in the range: $0 \leq s \leq 0.03$.

In the general formula: $Li_xNi_{(1-y-z)}Co_yMn_zA_aO_2$, x is changed depending on the charged or discharged state, and, when x is less than 0.05 in the charged state, the structure of crystal phase is likely to break during the repetition of the charge/discharge cycle and the like, and part of the crystal phase loses reversibility, so that the charge/discharge capacity is disadvantageously lowered. On the other hand, when x is larger than 1.15 in the discharged state, the state of the mixture in the positive electrode is poor, or Li which does not contribute to the charge/discharge reaction is increased, so that the volume energy density is disadvantageously lowered markedly. Therefore, it is preferred that x falls in the range: $0.05 \leq x \leq 1.15$.

In the general formula: $Li_xNi_{(1-y-z)}Co_yMn_zA_aO_2$, with respect to the Co content, the larger the Co content, the higher the charge/discharge efficiency, but the reduction of the Ni content disadvantageously lowers the capacity. In addition, the increase of the Co content tends to increase the discharge voltage. From the above point of view, it is preferred that y falls in the range: $0.00 \leq y \leq 0.50$ and is appropriately changed depending on the battery characteristics required.

In the general formula: $Li_xNi_{(1-y-z)}Co_yMn_zA_aO_2$, when z is less than 0.05, the crystal structure is unstable in the charged state, i.e., lithium-dedoped state. Therefore, the crystal structure is broken by a thermal stress imposed during the charge/discharge cycle including the repeated unstable state or during the storage at a high temperature, thus inhibiting absorption or release of lithium, so that the performance of the cathode active material considerably deteriorates. On the other hand, when z is larger than 0.40, the high-temperature characteristics and the cycle characteristics are improved, but the charge/discharge capacity is drastically lowered. From the above point of view, it is preferred that z falls in the range: $0.05 \leq z \leq 0.40$.

In the general formula: $Li_xNi_{(1-y-z)}Co_yMn_zA_aO_2$, when a is larger than 0.10, a substance, which cannot become a solid solution and does not contribute to the charge/discharge, increases, lowering the charge/discharge capacity markedly. Therefore, it is preferred that a falls in the range: $0 \leq a \leq 0.10$.

It is preferred that the second cathode active material is made of secondary particles formed from aggregate of primary particles having a size of 5 μm or less. When the size of the primary particles is larger than 5 μm, the particles are broken due to the expansion or shrinkage caused by charge or discharge, thus lowering the cycle characteristics.

It is preferred that the content of the second cathode active material in the cathode active material is in the range of from 10 to 40% by weight. When the second cathode active material content is less than 10% by weight, the cycle characteristics and the low-temperature heavy load characteristics become poor. On the other hand, when the content is larger than 40% by weight, the charge/discharge efficiency and the average discharge potential are lowered.

It is preferred that the second cathode active material has a specific surface area in the range of from 0.2 to 1.5 $m^2/g$. When the specific surface area is larger than 1.5 $m^2/g$, the high-temperature cycle characteristics become poor. The reason for this is presumed that, when the specific surface area is larger than 1.5 $m^2/g$, the contact area between the cathode active material and the electrolytic solution is increased to cause the electrolytic solution to easily decompose. On the other hand, when the specific surface area is less than 0.2 $m^2/g$, the charge/discharge efficiency is lowered. The reason for this is presumed that the contact area between the cathode active material and the electrolytic solution is reduced to cause the transfer of lithium ions between the cathode active material and the electrolytic solution to be poor.

It is preferred that the cathode active material layer has an electrode volume density in the range of from 3.1 to 3.7 $g/cm^3$. When the electrode volume density of the cathode active material layer is less than 3.1 $g/cm^3$, the capacity of the battery is lowered. On the other hand, the cathode active material layer having an electrode volume density of larger than 3.7 $g/cm^3$ is difficult to form by pressing.

The cathode active material comprising a mixture of the first and second cathode active materials preferably has an average particle size of 30 μm or less, more preferably 2 to 30 μm. When the average particle size exceeds 30 μm, the first cathode active material and the second cathode active material are not satisfactorily mixed with each other to cause potential distribution in the electrode, thus making it difficult to obtain a satisfactory effect.

As an example of a method for synthesizing the lithium-transition metal composite oxide represented by a general formula: $Li_xNi_{(1-y-z)}Co_yMn_zA_aO_2$, there can be mentioned a method in which hydroxides of nickel (Ni), cobalt (Co), manganese (Mn), or the like as a source of transition metal are adjusted in amounts according to the composition and mixed together, and lithium hydroxide (LiOH) as a source of lithium is mixed into the mixture and calcined in an oxygen gas atmosphere that ranges from 600 to 1,100° C. The starting raw materials as a source of transition metal usable in the present invention are not limited to the above-mentioned materials, but carbonate, nitrate, sulfonate, or the like of a transition metal can be used. Alternatively, composite transition metal hydroxide, carbonate, or the like containing a plurality of transition metals can be used. As the starting raw material as a source of lithium, instead of the hydroxide, $Li_2O$, $Li_2CO_3$, $LiNO_3$, or the like can be used.

Negative Electrode

The negative electrode 3 includes a strip-form current collector for negative electrode, and anode active material layers formed on both surfaces of the current collector for negative electrode. The current collector for negative electrode is a metallic foil that includes, for example, copper, stainless steel, nickel or the like. The anode active material layer is made of, for example, an anode active material, a conductor, and a binder.

As the binder, for example, polytetrafluoroethylene, polyvinylidene fluoride (PVdF), polyethylene, or the like can be used. As the conductor, for example, carbon powder of graphite or carbon black can be used.

The anode active material may be lithium metal or any material which can electrochemically absorb or release lithium at a potential lower than the potential for lithium, and, with respect to the form or type, there is no particular limitation. Specifically, as the cathode active material, pyrolytic carbon, coke, such as, pitch coke, needle coke, and petroleum coke, graphite, such as, natural graphite, synthetic graphite, and graphite, glassy carbon, a calcined product of an organic polymer compound, such as obtained by calcining a phenolic resin, a furan resin, or the like at an appropriate temperature, carbon fiber, activated carbon, or the like can be used. Alternatively, a lithium alloy including lithium and aluminum, lead, copper, or indium, a metal oxide, such as iron oxide, titanium oxide, or tin oxide, a material froming an intermetallic compound, or a polymer which can absorb or release lithium, such as polyacetylene or polypyrrole, can be used.

Separator 4

With respect to the separator 4, there is no particular limitation, and woven fabric, non-woven fabric, a synthetic resin microporous film, or the like can be used, and a synthetic resin microporous film can be preferably used. For example, a polyolefin microporous film of polyethylene or polypropylene can be used.

Electrolyte

As the electrolyte, a non-aqueous electrolytic solution obtained by dissolving an electrolytic salt in an organic solvent can be used. As the organic solvent, any organic solvent used in the battery of this type can be used, and, for example, propylene carbonate, ethylene carbonate, 1,2-dimethoxyethane, γ-butyrolactone, diethyl ether, tetrahydrofuran, 2-methyltetrahydrofuran, 1,3-dioxolane, sulfolane (tetrahydrothiophene 1,1-dioxide), acetonitrile, dimethyl carbonate, diethyl carbonate, dipropyl carbonate, methylethyl carbonate, or methylpropyl carbonate can be used individually or used in the form of a mixed solvent of two or more solvents.

As the electrolytic salt, any electrolytic salt used in the battery of this type can be used, and, for example, a lithium salt, such as $LiClO_4$, $LiAsF_6$, $LiPF_6$, $LiBF_4$, $LiB(C_6H_5)_4$, $LiCH_3SO_3$, $LiCF_3SO_3$, LiCi, or LiBr, can be used.

According to an embodiment of the present invention, the following effects can be obtained.

The non-aqueous electrolyte secondary battery includes a positive electrode 2 comprising cathode active material layers formed on both surfaces of a strip-form current collector for positive electrode, a negative electrode 3 comprising anode active material layers formed on both surfaces of a strip-form current collector for negative electrode, a separator 4 disposed between the positive electrode 2 and the negative electrode 3, and an electrolyte comprising an electrolytic salt dissolved in an organic solvent. The cathode active material includes a mixture of a first cathode active material and a second cathode active material. The first cathode active material is made of a lithium-cobalt composite oxide represented by a general formula: $Li_tCoM_sO_2$, wherein M represents a metal, $0 \leq s \leq 0.03$, and $0.05 \leq t \leq 1.15$. The second cathode active material is made of a lithium-transition metal composite oxide represented by a general formula: $Li_xNi_{(1-y-z)}Co_yMn_zA_aO_2$ wherein A represents a metal, $0 \leq a \leq 0.10$, $0.05 \leq x \leq 1.15$, $0.15 \leq y+z \leq 0.70$, and $0.05 \leq z \leq 0.40$. Thus, there can be achieved a non-aqueous electrolyte secondary battery which is advantageous not only in that it has high capacity, but also in that it is excellent in both cycle characteristics and low-temperature heavy load characteristics.

Hereinbelow, the present invention will be described in detail with reference to the following Examples, which should not be construed as limiting the scope of the present invention.

First, Examples 1 to 5 and Comparative Examples 1 to 5 for studies on the composition of the second cathode active material are described.

EXAMPLE 1

Synthesis of Second Cathode Active Material:

Commercially available lithium hydroxide, nickel hydroxide, cobalt hydroxide, and manganese hydroxide were mixed so that the amounts of lithium, nickel, cobalt, and manganese became 1.05, 0.85, 0.10, and 0.05, respectively, in terms of molar ratio, and calcined at 900° C. in an oxygen gas stream to prepare powder lithium composite oxide (second cathode active material) represented by a general formula: $Li_{1.05}Ni_{0.85}Co_{0.10}Mn_{0.05}O_2$. This lithium composite oxide was subjected to measurement of X-ray diffractometry. As a result, it has been confirmed that the lithium composite oxide is a substance having a structure substantially similar to that of $LiNiO_2$. In the peaks observed, there was not any peak other than the peaks derived from $LiNiO_2$, which confirmed that the lithium composite oxide is a substance of a single layer comprising a solid solution of cobalt and manganese formed at the site of nickel.

Synthesis of First Cathode Active Material:

Commercially available lithium hydroxide and cobalt hydroxide were mixed so that the amounts of lithium and cobalt became 1.10 and 1.00, respectively, in terms of molar ratio, and calcined at 900° C. in an oxygen gas stream to prepare powder lithium-cobalt composite oxide (first cathode active material) represented by a general formula: $Li_{1.10}CoO_2$. The first cathode active material had a specific surface area of 0.35 m²/g.

Preparation of Positive Electrode:

The thus prepared first cathode active material and second cathode active material were mixed so that the weight ratio of (first cathode active material):(second cathode active material) became 90:10 to obtain a cathode active material. Into 90% by weight of the cathode active material were mixed 7% by weight of graphite as a conductor and 3% by weight of polyvinylidene fluoride (PVdF) as a binder, and dispersed in N-methyl-2-pyrrolidone (NMP) to prepare a cathode mixture slurry.

Then, the cathode mixture slurry was uniformly applied with a thickness of 120 μm to the both surfaces of a strip-form aluminum foil having a thickness of 25 μm and dried, and then pressed by means of a roller press to form a cathode active material layer, thus obtaining a strip-form positive electrode 2.

Preparation of Negative Electrode:

As an anode active material, 10% by weight of PVdF was mixed with 90% by weight of powder synthetic graphite, and dispersed in NMP to prepare an anode mixture slurry. The anode mixture slurry was uniformly applied with a thickness of 120 μm to the both surfaces of a copper foil having a thickness of 15 μm and dried, and then pressed by means of a roller press to form an anode active material layer, thus obtaining a strip-form negative electrode 3.

Battery Assembling:

Between the thus prepared strip-form positive electrode 2 and strip-form negative electrode 3 was disposed a porous polyolefin film 4 as a separator, and they were together spirally wound many times to form a spirally-wound electrode structure. The spirally-wound electrode structure was placed in a battery casing 1 made of nickel-plated iron, and insulating plates 5, 6 were respectively placed on the top and bottom of the electrode structure. Then, a positive electrode lead made of aluminum was electrically introduced from a current collector for positive electrode, and welded to a protruding portion of a safety valve 8, which was surely electrically connected to a battery lid 7, and a negative electrode lead made of nickel was electrically introduced from a current collector for negative electrode and welded to the bottom of the battery casing 1.

Ethylene carbonate and methylethyl carbonate were mixed in a 1:1 volume ratio to obtain a mixed solvent. Then, $LiPF_6$ was dissolved in the mixed solution so that the concentration became 1 mol/dm³ to prepare a non-aqueous electrolytic solution.

Finally, the thus prepared non-aqueous electrolytic solution was charged into the battery casing 1 containing the spirally-wound electrode structure, and then the battery casing 1 was caulked through an insulating sealing gasket 10 to fix the safety valve 8, the PTC element 9, and the battery lid 7 to produce a cylinder-type non-aqueous electrolyte secondary battery (non-aqueous electrolytic solution secondary battery) having an outer diameter of 18 mm and a height of 65 mm.

Evaluation of Characteristics:

With respect to the above-produced non-aqueous electrolyte secondary battery, the characteristics were evaluated as follows.

(1) Initial Capacity

The charging operation was first conducted under conditions such that the environment temperature was 25° C., the charge voltage was 4.20 V, the charge current was 1,000 mA, and the charge time was 2.5 hours, and then the discharging operation was conducted at a discharge current of 750 mA at a final voltage of 3.0 V to determine an initial capacity.

(2) Initial Charge/Discharge Efficiency

Next, based on the above-determined initial capacity, an initial discharge efficiency was determined.

(3) Capacity Retaining Ratio After the 150th Cycle

The charging and discharging operations were conducted repeatedly at an environment temperature of 25° C., and a discharge capacity at the 150th cycle was measured to determine a capacity retaining ratio relative to the initial capacity.

(4) Voltage Drop During the Output at 20 W at 0° C.

With respect to the non-aqueous electrolyte secondary battery which was charged at a charge voltage of 4.2 V after the 3rd cycle in the same process, the output discharging operation was conducted at 20 W at an environment temperature of 0° C. and the voltage drop during the output was recorded.

EXAMPLE 2

A non-aqueous electrolyte secondary battery was obtained in substantially the same manner as in Example 1 except that commercially available lithium hydroxide, nickel hydroxide, cobalt hydroxide, and manganese hydroxide were mixed so that the amounts of lithium, nickel, cobalt, and manganese became 1.05, 0.30, 0.65, and 0.05, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

EXAMPLE 3

A non-aqueous electrolyte secondary battery was obtained in substantially the same manner as in Example 1 except that commercially available lithium hydroxide, nickel hydroxide, cobalt hydroxide, and manganese hydroxide were mixed so that the amounts of lithium, nickel, cobalt, and manganese became 1.05, 0.60, 0.00, and 0.40, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

EXAMPLE 4

A non-aqueous electrolyte secondary battery was obtained in substantially the same manner as in Example 1 except that commercially available lithium hydroxide, nickel hydroxide, cobalt hydroxide, and manganese hydroxide were mixed so that the amounts of lithium, nickel, cobalt, and manganese became 1.05, 0.30, 0.30, and 0.40, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

EXAMPLE 5

A non-aqueous electrolyte secondary battery was obtained in substantially the same manner as in Example 1 except that commercially available lithium hydroxide, nickel hydroxide, cobalt hydroxide, manganese hydroxide, and aluminum hydroxide were mixed so that the amounts of lithium, nickel, cobalt, manganese, and aluminum became 1.05, 0.85, 0.10, 0.00, and 0.05, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 1

A non-aqueous electrolyte secondary battery was obtained in substantially the same manner as in Example 1 except that commercially available lithium hydroxide, nickel hydroxide, cobalt hydroxide, and manganese hydroxide were mixed so that the amounts of lithium, nickel, cobalt, and manganese became 1.05, 0.90, 0.05, and 0.05, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 2

A non-aqueous electrolyte secondary battery was obtained in substantially the same manner as in Example 1 except that commercially available lithium hydroxide, nickel hydroxide, cobalt hydroxide, and manganese hydroxide were mixed so that the amounts of lithium, nickel, cobalt, and manganese became 1.05, 0.25, 0.70, and 0.05, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 3

A non-aqueous electrolyte secondary battery was obtained in substantially the same manner as in Example 1 except that commercially available lithium hydroxide, nickel hydroxide, cobalt hydroxide, and manganese hydroxide were mixed so that the amounts of lithium, nickel, cobalt, and manganese became 1.05, 0.55, 0.00, and 0.45, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 4

A non-aqueous electrolyte secondary battery was obtained in substantially the same manner as in Example 1 except that commercially available lithium hydroxide, nickel hydroxide, cobalt hydroxide, and manganese hydroxide were mixed so that the amounts of lithium, nickel, cobalt, and manganese became 1.05, 0.30, 0.25, and 0.45, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 5

A non-aqueous electrolyte secondary battery was obtained in substantially the same manner as in Example 1 except that commercially available lithium hydroxide, nickel hydroxide, cobalt hydroxide, manganese hydroxide, and aluminum hydroxide were mixed so that the amounts of lithium, nickel, cobalt, manganese, and aluminum became 1.05, 0.30, 0.30, 0.25, and 0.15, respectively, in terms of molar ratio. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

The constructions of the batteries produced in Examples 1 to 5 and Comparative Examples 1 to 5 and the results of the evaluations are shown in Table 1.

TABLE 1

| | Second cathode active material | | | | Weight ratio (A:B) | Initial capacity [mAh] | Initial charge/discharge efficiency [%] | Capacity retaining ratio after 150th cycle [%] | Voltage drop during output at 20 W at 0° C. [V] |
|---|---|---|---|---|---|---|---|---|---|
| | Ni Ratio $1-y-z$ | Co Ratio $y$ | Mn Ratio $z$ | A $a$ | | | | | |
| Example 1 | 0.85 | 0.10 | 0.05 | — | 90:10 | 2,156 | 90.3 | 90.8 | 3.31 |
| Example 2 | 0.30 | 0.65 | 0.05 | — | 90:10 | 2,051 | 93.9 | 92.1 | 3.23 |
| Example 3 | 0.60 | 0.00 | 0.40 | — | 90:10 | 2,097 | 91.6 | 90.1 | 3.20 |
| Example 4 | 0.30 | 0.30 | 0.40 | — | 90:10 | 2,068 | 93.4 | 91.5 | 3.22 |
| Example 5 | 0.85 | 0.10 | 0.00 | 0.05 | 90:10 | 2,048 | 91.6 | 92.8 | 3.20 |
| Comparative Example 1 | 0.90 | 0.05 | 0.05 | — | 90:10 | 2,133 | 87.3 | 85.1 | 3.10 |
| Comparative Example 2 | 0.25 | 0.70 | 0.05 | — | 90:10 | 2,074 | 93.9 | 84.2 | 3.07 |
| Comparative Example 3 | 0.55 | 0.00 | 0.45 | — | 90:10 | 2,076 | 91.2 | 86.6 | 3.09 |
| Comparative Example 4 | 0.30 | 0.25 | 0.45 | — | 90:10 | 2,057 | 93.4 | 87.5 | 3.04 |
| Comparative Example 5 | 0.30 | 0.30 | 0.25 | 0.15 | 90:10 | 1,994 | 91.4 | 88.5 | 3.12 |

From Table 1, the following findings are obtained. Specifically, in the second cathode active material represented by the chemical formula: $Li_xNi_{(1-y-z)}Co_yMn_zA_aO_2$ (wherein A represents a metal, and $0 \leq a \leq 0.10$), when x, y, and z fall in the respective ranges: $0.05 \leq x \leq 1.15$, $0.15 \leq y+z \leq 0.70$, and $0.05 \leq z \leq 0.40$, not only can the capacity retaining ratio after the 150th cycle be improved, but also the voltage drop during the output at 20 W at 0° C. can be suppressed. That is, both the cycle characteristics and the low-temperature heavy load characteristics can be improved.

The improvement of the capacity retaining ratio after the 150th cycle and the prevention of the voltage drop during the output at 20 W at 0° C. are judged based on the following standards.
Standard for capacity retaining ratio: 90.0%
Standard for voltage drop: 3.10 V Next, Examples 6 to 8 and Comparative Examples 6 to 8 for studies on the composition of the first cathode active material are described.

EXAMPLE 6

Synthesis of Second Cathode Active Material:

Commercially available lithium hydroxide, nickel hydroxide, cobalt hydroxide, and manganese hydroxide were mixed so that the amounts of lithium, nickel, cobalt, and manganese became 1.05, 0.30, 0.30, and 0.40, respectively, in terms of molar ratio, and calcined at 900° C. in an oxygen gas stream to prepare powder lithium composite oxide (second cathode active material) represented by a general formula: $Li_{1.05}Ni_{0.3}Co_{0.3}Mn_{0.4}O_2$.

Synthesis of First Cathode Active Material:

Commercially available lithium hydroxide, cobalt hydroxide, and aluminum hydroxide were mixed so that the amounts became 1.00, 1.00, and 0.03, respectively, in terms of molar ratio, and calcined at 900° C. in an oxygen gas stream to prepare powder lithium-cobalt composite oxide (first cathode active material) represented by a general formula: $Li_{1.00}CoAl_{0.03}O_2$.

The subsequent steps were conducted in the same manner as in Example 1 to obtain a non-aqueous electrolyte secondary battery. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

EXAMPLE 7

A non-aqueous electrolyte secondary battery was obtained in substantially the same manner as in Example 6 except that, in the synthesis of the first cathode active material, commercially available lithium hydroxide, cobalt hydroxide, and magnesium carbonate were mixed so that the amounts became 1.00, 1.00, and 0.03, respectively, in terms of molar ratio, and calcined at 900° C. in an oxygen gas stream to prepare powder lithium-cobalt composite oxide (first cathode active material) represented by a general formula: $Li_{1.00}CoMg_{0.03}O_2$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

EXAMPLE 8

A non-aqueous electrolyte secondary battery was obtained in substantially the same manner as in Example 6 except that, in the synthesis of the first cathode active material, commercially available lithium hydroxide, cobalt hydroxide, aluminum hydroxide, and magnesium carbonate were mixed so that the amounts became 1.00, 1.00, 0.015, and 0.015, respectively, in terms of molar ratio, and calcined at 900° C. in an oxygen gas stream to prepare powder lithium-cobalt composite oxide (first cathode active material) represented by a general formula: $Li_{1.00}CoAl_{0.015}Mg_{0.015}O_2$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 6

A non-aqueous electrolyte secondary battery was obtained in substantially the same manner as in Example 6 except that, in the synthesis of the first cathode active material, commercially available lithium hydroxide, cobalt hydroxide, and aluminum hydroxide were mixed so that the amounts became 1.00, 1.00, and 0.05, respectively, in terms of molar ratio, and calcined at 900° C. in an oxygen gas stream to prepare powder lithium-cobalt composite oxide (first cathode active material) represented by a general formula: $Li_{1.00}CoAl_{0.5}O_2$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 7

A non-aqueous electrolyte secondary battery was obtained in substantially the same manner as in Example 6 except that, in the synthesis of the first cathode active material, commercially available lithium hydroxide, cobalt hydroxide, and magnesium carbonate were mixed so that the amounts became 1.00, 1.00, and 0.05, respectively, in terms of molar ratio, and calcined at 900° C. in an oxygen gas stream to prepare powder lithium-cobalt composite oxide (first cathode active material) represented by a general formula: $Li_{1.00}CoMg_{0.05}O_2$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

COMPARATIVE EXAMPLE 8

A non-aqueous electrolyte secondary battery was obtained in substantially the same manner as in Example 6 except that, in the synthesis of the first cathode active material, commercially available lithium hydroxide, cobalt hydroxide, aluminum hydroxide, and magnesium carbonate were mixed so that the amounts became 1.00, 1.00, 0.03, and 0.03, respectively, in terms of molar ratio, and calcined at 900° C. in an oxygen gas stream to prepare powder lithium-cobalt composite oxide (first cathode active material) represented by a general formula: $Li_{1.00}CoAl_{0.03}Mg_{0.03}O_2$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1.

The constructions of the batteries produced in Examples 4 and 6 to 8 and Comparative Examples 6 to 8 and the results of the evaluations are shown in Table 2.

From Table 2, the following findings are obtained. Specifically, in the first cathode active material represented by a general formula: $Li_xCoM_sO_2$, when the metal M is at least one member selected from Al and Mg and s falls in the range: $0 \leq s \leq 0.03$, not only can the capacity retaining ratio after the 150th cycle be improved, but also the lowering of the initial capacity can be suppressed. That is, the cycle characteristics can be improved and the lowering of the initial capacity can be suppressed.

The improvement of the capacity retaining ratio after the 150th cycle and the prevention of lowering of the initial capacity are judged based on the following standards.

Standard for capacity retaining ratio: 90.0%
Standard for initial capacity: 2,000 mAh Next, Examples 9 to 11 and Comparative Examples 9 and 10 for studies on the weight ratio of the first cathode active material and the second cathode active material are described.

EXAMPLE 9

Synthesis of Second Cathode Active Material:

Commercially available lithium hydroxide, nickel hydroxide, cobalt hydroxide, and manganese hydroxide were mixed so that the amounts of lithium, nickel, cobalt, and manganese became 1.00, 0.30, 0.30, and 0.40, respectively, in terms of molar ratio, and calcined in an oxygen gas stream to prepare powder lithium composite oxide (second cathode active material) represented by a general formula: $Li_{1.00}Ni_{0.30}Co_{0.30}Mn_{0.40}O_2$.

Synthesis of First Cathode Active Material:

Commercially available lithium hydroxide and cobalt hydroxide were mixed so that the amounts of lithium and cobalt became 1.00 and 1.00, respectively, in terms of molar ratio, and calcined in an oxygen gas stream to prepare powder lithium-cobalt composite oxide (first cathode active material) represented by a general formula: $Li_{1.00}CoO_2$.

Preparation of Positive Electrode:

The thus prepared first cathode active material and second cathode active material were mixed so that the weight ratio of (first cathode active material):(second cathode active material) became 85:15 to obtain a cathode active material.

The subsequent steps were conducted in the same manner as in Example 1 to obtain a non-aqueous electrolyte secondary battery. Subsequently, (1) an initial capacity, (2) an

TABLE 2

| | First cathode active material M | | Weight ratio | Initial capacity | Initial charge/ discharge efficiency | Capacity retaining ratio after 150th cycle | Voltage drop during output at 20 W at 0° C. |
|---|---|---|---|---|---|---|---|
| | Al | Mg | (A:B) | [mAh] | [%] | [%] | [V] |
| Example 4 | — | — | 90:10 | 2,068 | 93.4 | 91.5 | 3.22 |
| Example 6 | 0.03 | — | 90:10 | 2,020 | 92.9 | 93.1 | 3.20 |
| Example 7 | — | 0.03 | 90:10 | 2,015 | 92.6 | 92.6 | 3.21 |
| Example 8 | 0.015 | 0.015 | 90:10 | 2,019 | 93.5 | 93.4 | 3.20 |
| Comparative Example 6 | 0.05 | — | 90:10 | 1,962 | 89.4 | 90.5 | 3.18 |
| Comparative Example 7 | — | 0.05 | 90:10 | 1,959 | 89.9 | 91.4 | 3.20 |
| Comparative Example 8 | 0.03 | 0.03 | 90:10 | 1,925 | 89.2 | 90.8 | 3.22 | initial charge/discharge efficiency, (3) a capacity retaining ratio after the 150th cycle, and (4) the voltage drop during the output at 20 W at 0° C. were determined in the same manner as in Example 1. Further, the charging operation was conducted under conditions such that the environment temperature was 25° C., the charge voltage was 4.20 V, the charge current was 500 mA, and the charge time was 9 hours, and then the charging operation was conducted at a discharge current of 200 mA at a final voltage of 3.0 V to determine an average discharge potential.

EXAMPLE 10

A non-aqueous electrolyte secondary battery was obtained in substantially the same manner as in Example 9 except that the first cathode active material and the second cathode active material were mixed so that the weight ratio of (first cathode active material):(second cathode active material) became 75:25 to obtain a cathode active material. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1. Further, an average discharge potential was determined in the same manner as in Example 9.

discharge efficiency, (3) a capacity retaining ratio after the 150th cycle, and (4) the voltage drop during the output at 20 W at 0° C. were determined in the same manner as in Example 1. Further, an average discharge potential was determined in the same manner as in Example 9.

COMPARATIVE EXAMPLE 10

A non-aqueous electrolyte secondary battery was obtained in substantially the same manner as in Example 9 except that the first cathode active material and the second cathode active material were mixed so that the weight ratio of(first cathode active material):(second cathode active material) became 50:50 to obtain a cathode active material. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1. Further, an average discharge potential was determined in the same manner as in Example 9.

The constructions of the batteries produced in Examples 4 and 9 to 11 and Comparative Examples 9 and 10 and the results of the evaluations are shown in Table 3.

TABLE 3

| | Second cathode active material | | | | Weight ratio (A:B) | Initial capacity [mAh] | Initial charge/ discharge efficiency [%] | Capacity retaining ratio after 150th cycle [%] | Voltage drop during output at 20 W at 0° C. [V] | Maximum packing density of electrode [g/cm³] |
|---|---|---|---|---|---|---|---|---|---|---|
| | Ni Ratio $1-y-z$ | Co Ratio $y$ | Mn Ratio $z$ | A a | | | | | | |
| Example 4 | 0.30 | 0.30 | 0.40 | — | 90:10 | 2,068 | 93.4 | 91.5 | 3.22 | 3.63 |
| Example 9 | 0.30 | 0.30 | 0.40 | — | 85:15 | 2,072 | 93.2 | 91.7 | 3.27 | 3.65 |
| Example 10 | 0.30 | 0.30 | 0.40 | | 75:25 | 2,078 | 93.0 | 91.9 | 3.29 | 3.60 |
| Example 11 | 0.30 | 0.30 | 0.40 | — | 60:40 | 2,087 | 92.9 | 92.1 | 3.30 | 3.56 |
| Comparative Example 9 | 0.30 | 0.30 | 0.40 | — | 100:0 | 2,003 | 94.3 | 83.3 | 3.02 | 3.60 |
| Comparative Example 10 | 0.30 | 0.30 | 0.40 | — | 50:50 | 2,087 | 89.6 | 93.9 | 3.32 | 3.54 |

EXAMPLE 11

A non-aqueous electrolyte secondary battery was obtained in substantially the same manner as in Example 9 except that the first cathode active material and the second cathode active material were mixed so that the weight ratio of (first cathode active material):(second cathode active material) became 60:40 to obtain a cathode active material. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1. Further, an average discharge potential was determined in the same manner as in Example 9.

COMPARATIVE EXAMPLE 9

A non-aqueous electrolyte secondary battery was obtained in substantially the same manner as in Example 9 except that the first cathode active material and the second cathode active material were mixed so that the weight ratio (first cathode active material):(second cathode active material) became 100:0 to obtain a cathode active material. Subsequently, (1) an initial capacity, (2) an initial charge/

From Table 3, the following findings are obtained. Specifically, it is found that, when the content of the second cathode active material in the cathode active material is less than 10% by weight, the capacity retaining ratio after the 150th cycle is lowered and the voltage drop during the output at 20 W at 0° C. is large. Further, it is found that, when the content of the second cathode active material in the cathode active material is more than 40% by weight, the capacity retaining ratio after the 150th cycle can be improved and the voltage drop during the output at 20 W at 0° C. can be suppressed, but the initial charge/discharge efficiency is disadvantageously lowered. In addition, it is also found that, when the content of the second cathode active material in the cathode active material is more than 40% by weight, the average discharge potential is lowered.

From the above results, it is found that, when the content of the second cathode active material in the cathode active material falls in the range of from 10 to 40% by weight, the cycle characteristics and the low-temperature heavy load characteristics as well as the initial charge/discharge efficiency can be improved. Further, it is found that, considering the maximum packing density of the electrode, when the second cathode active material content falls in the range of from 15 to 25% by weight, not only be the characteristics of the battery excellent, but also the packing density of the battery can be improved.

The improvement of the capacity retaining ratio after the 150th cycle, the prevention of the voltage drop during the output at 20 W at 0° C., and the lowering of the initial charge/discharge efficiency are judged based on the following standards.

Standard for capacity retaining ratio: 90.0%
Standard for voltage drop: 3.10 V
Standard for initial charge/discharge efficiency: 90.0%

Next, Examples 12 to 15 and Comparative Examples 11 and 12 for studies on the specific surface area of the second cathode active material are described.

EXAMPLE 12

Synthesis of Second Cathode Active Material:

Commercially available lithium hydroxide, nickel hydroxide, cobalt hydroxide, and manganese hydroxide were mixed so that the amounts of lithium, nickel, cobalt, and manganese became 1.05, 0.30, 0.30, and 0.40, respectively, in terms of molar ratio, and calcined at 900° C. in an oxygen gas stream to prepare powder lithium composite oxide (second cathode active material) represented by a general formula: $Li_{1.05}Ni_{0.30}Co_{0.30}Mn_{0.40}O_2$. The second cathode active material had a specific surface area of 0.2 $m^2/g$ as measured by a BET method.

Synthesis of First Cathode Active Material:

Commercially available lithium hydroxide and cobalt hydroxide were mixed so that the amounts of lithium and cobalt became 1.00 and 1.00, respectively, in terms of molar ratio, and calcined at 900° C. in an oxygen gas stream to prepare powder lithium-cobalt composite oxide (first cathode active material) represented by a general formula: $Li_{1.00}CoO_2$. The first cathode active material had a specific surface area of 0.30 $m^2/g$.

Preparation of Positive Electrode:

The thus prepared first cathode active material and second cathode active material were mixed so that the weight ratio of (first cathode active material):(second cathode active material) became 80:20 to obtain a cathode active material.

The subsequent steps were conducted in the same manner as in Example 1 to obtain a non-aqueous electrolyte secondary battery. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 1. With respect to the (3) capacity retaining ratio after the 150th cycle, it is noted that the environment temperature at which the charging and discharging operations were conducted repeatedly was changed from 25° C. to 45° C.

EXAMPLE 13

A non-aqueous electrolyte secondary battery was obtained in substantially the same manner as in Example 12 except that the second cathode active material had a specific surface area of 0.3 $m^2/g$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 12.

EXAMPLE 14

A non-aqueous electrolyte secondary battery was obtained in substantially the same manner as in Example 12 except that the second cathode active material had a specific surface area of 0.5 $m^2/g$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 12.

EXAMPLE 15

A non-aqueous electrolyte secondary battery was obtained in substantially the same manner as in Example 12 except that the second cathode active material had a specific surface area of 1.5 $m^2/g$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 12.

COMPARATIVE EXAMPLE 11

A non-aqueous electrolyte secondary battery was obtained in substantially the same manner as in Example 12 except that the second cathode active material had a specific surface area of 0.1 $m^2/g$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 12.

COMPARATIVE EXAMPLE 12

A non-aqueous electrolyte secondary battery was obtained in substantially the same manner as in Example 12 except that the second cathode active material had a specific surface area of 2.0 $m^2/g$. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 12.

The constructions of the batteries produced in Examples 12 to 15 and Comparative Examples 11 and 12 and the results of the measurements are shown in Table 4.

TABLE 4

| | Second cathode active material | | | | Weight ratio (A:B) | Initial capacity [mAh] | Initial charge/discharge efficiency [%] | Capacity retaining ratio at 45° C. after 150th cycle [%] | Voltage drop during output at 20 W at 0° C. [V] |
|---|---|---|---|---|---|---|---|---|---|
| | Ni Ratio $1 - y - z$ | Co Ratio $y$ | Mn Ratio $z$ | Specific surface area $m^2/g$ | | | | | |
| Example 12 | 0.30 | 0.30 | 0.40 | 0.2 | 80:20 | 2,059 | 92.30 | 92.6 | 3.20 |
| Example 13 | 0.30 | 0.30 | 0.40 | 0.3 | 80:20 | 2,060 | 92.90 | 92.5 | 3.25 |
| Example 14 | 0.30 | 0.30 | 0.40 | 0.5 | 80:20 | 2,061 | 93.20 | 92.5 | 3.28 |
| Example 15 | 0.30 | 0.30 | 0.40 | 1.5 | 80:20 | 2,063 | 93.40 | 91.8 | 3.28 |

TABLE 4-continued

| | Second cathode active material | | | | | Initial capacity [mAh] | Initial charge/ discharge efficiency [%] | Capacity retaining ratio at 45° C. after 150th cycle [%] | Voltage drop during output at 20 W at 0° C. [V] |
|---|---|---|---|---|---|---|---|---|---|
| | Ni Ratio $1-y-z$ | Co Ratio $y$ | Mn Ratio $z$ | Specific surface area $m^2/g$ | Weight ratio (A:B) | | | | |
| Comparative Example 11 | 0.30 | 0.30 | 0.40 | 0.1 | 80:20 | 2,046 | 87.50 | 87.6 | 3.02 |
| Comparative Example 12 | 0.30 | 0.30 | 0.40 | 2.0 | 80:20 | 2,055 | 92.60 | 82.3 | 3.32 |

From Table 4, the following findings are obtained. Specifically, it is found that, when the specific surface area is more than 1.5 m²/g, the contact area between the cathode active material and the electrolytic solution is too large and hence the electrolytic solution disadvantageously decomposes, so that the capacity retaining ratio at 45° C. after the 150th cycle is lowered. Further, it is found that, when the specific surface area is less than 0.2 g/cm³, the contact area between the cathode active material and the electrolytic solution is too small, so that the initial charge/discharge efficiency is lowered.

From the above results, it is found that, when the second cathode active material has a specific surface area in the range of from 0.2 to 1.5 m²/g, both the cycle characteristics and the initial charge/discharge efficiency can be improved. In addition, it is found that, when the second cathode active material has a specific surface area in the range of from 0.3 to 0.5 m²/g, the high-temperature cycle characteristics and the low-temperature heavy load characteristics can be improved while balancing them.

The lowering of the capacity retaining ratio after the 150th cycle and the lowering of the initial charge/discharge efficiency are judged based on the following standards.
Standard for capacity retaining ratio: 90.0%
Standard for initial charge/discharge efficiency: 90.0%

Next, Examples 16 to 18 and Comparative Examples 13 and 14 for studies on the volume density of the cathode active material layer are described.

EXAMPLE 16

Synthesis of Second Cathode Active Material:

Commercially available lithium hydroxide, nickel hydroxide, cobalt hydroxide, and manganese hydroxide were mixed so that the amounts of lithium, nickel, cobalt, and manganese became 1.05, 0.30, 0.30, and 0.40, respectively, in terms of molar ratio, and calcined at 900° C. in an oxygen gas stream to prepare powder lithium composite oxide (second cathode active material) represented by a general formula: $Li_{1.05}Ni_{0.30}Co_{0.30}Mn_{0.40}O_2$. The second cathode active material had a volume density of 3.1 g/cm³.

Synthesis of First Cathode Active Material:

Commercially available lithium hydroxide and cobalt hydroxide were mixed so that the amounts of lithium and cobalt became 1.00 and 1.00, respectively, in terms of molar ratio, and calcined at 900° C. in an oxygen gas stream to prepare powder lithium-cobalt composite oxide (first cathode active material) represented by a general formula: $Li_{1.00}CoO_2$.

Preparation of Positive Electrode:

The thus prepared first cathode active material and second cathode active material were mixed so that the weight ratio of (first cathode active material):(second cathode active material) became 80:20 to obtain a cathode active material.

The subsequent steps were conducted in the same manner as in Example 1 to obtain a non-aqueous electrolyte secondary battery. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 12.

EXAMPLE 17

A non-aqueous electrolyte secondary battery was produced in substantially the same manner as in Example 10 except that the cathode active material layer had a volume density of 3.4 g/cm³. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 16.

EXAMPLE 18

A non-aqueous electrolyte secondary battery was produced in substantially the same manner as in Example 10 except that the cathode active material layer had a volume density of 3.7 g/cm³. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 16.

COMPARATIVE EXAMPLE 13

A non-aqueous electrolyte secondary battery was produced in substantially the same manner as in Example 10 except that the cathode active material layer had a volume density of 3.0 g/cm³. Subsequently, (1) an initial capacity, (2) an initial charge/discharge efficiency, (3) a capacity retaining ratio after the 150th cycle, and (4) the voltage drop during the output at 20 W at 0° C. were determined in the same manner as in Example 16.

COMPARATIVE EXAMPLE 14

An attempt to form a cathode active material layer having a volume density of 3.8 g/cm³ was made, but the apparatus used was not able to press the cathode active material layer so that the volume density became as high as 3.8 g/cm³.

The constructions of the batteries produced in Examples 16 to 18 and Comparative Examples 13 and 14 and the results of the measurements are shown in Table 5.

TABLE 5

| | Second cathode active material | | | Volume density g/cm³ | Weight ratio (A:B) | Initial capacity [mAh] | Intial charge/ discharge efficiency [%] | Capacity retaining ratio at 45° C. after 150th cycle [%] | Voltage drop during output at 20 W at 0° C. [V] |
|---|---|---|---|---|---|---|---|---|---|
| | Ni Ratio $1-y-z$ | Co Ratio $y$ | Mn Ratio $z$ | | | | | | |
| Example 16 | 0.30 | 0.30 | 0.40 | 3.1 | 80:20 | 2,014 | 92.4 | 91.5 | 3.29 |
| Example 17 | 0.30 | 0.30 | 0.40 | 3.4 | 80:20 | 2,234 | 93.1 | 91.1 | 3.26 |
| Example 18 | 0.30 | 0.30 | 0.40 | 3.7 | 80:20 | 2,450 | 93.6 | 90.4 | 3.22 |
| Comparative Example 13 | 0.30 | 0.30 | 0.40 | 3.0 | 80:20 | 1,947 | 92.7 | 93.2 | 3.32 |
| Comparative Example 14 | 0.30 | 0.30 | 0.40 | 3.8 | 80:20 | — | — | — | — |

From Table 5, the following findings are obtained. Specifically, it is found that, when the volume density is less than 3.1 g/cm³, the initial capacity is considerably small. From the above results, it is found that, when the positive electrode has a volume density in the range of from 3.1 to 3.7 g/cm³, the marked lowering of the initial capacity can be suppressed. Further, it is found that, for obtaining a large capacity while maintaining the cycle characteristics and the low-temperature heavy load characteristics, the volume density preferably falls in the range of from 3.4 to 3.7 g/cm³.

The keeping of the cycle characteristics, the keeping of the low-temperature heavy load characteristics, and the large capacity (i.e., large initial capacity) are judged based on the following standards.

Standard for cycle characteristics (capacity retaining ratio after the 150th cycle): 90.0%

Standard for low-temperature heavy load characteristics (voltage drop during the output at 20 W at 0C): 3.10 V Standard for large capacity: 2,200 mAh Hereinabove, the embodiment of the present invention is described in detail, but the present invention is not limited to the above embodiment and can be changed or modified based on the technical concept of the present invention.

For example, the values used in the above embodiment are merely examples, and different values may be used if necessary.

In the above embodiment, there is shown an example in which the present invention is applied to a non-aqueous electrolyte secondary battery comprising a non-aqueous electrolytic solution as the electrolyte, but the present invention may be applied to a non-aqueous electrolyte secondary battery comprising a solid electrolyte or a gel electrolyte.

As the solid electrolyte, any of an inorganic solid electrolyte and a polymer solid electrolyte can be used as long as it is a material having lithium ion conduction properties. Examples of inorganic solid electrolytes include lithium nitride and lithium iodide. The polymer solid electrolyte includes an electrolytic salt and a polymer compound dissolving the electrolytic salt, and, as the polymer compound, an ether polymer, such as poly(ethylene oxide) or a cross-linked product thereof, a poly(methacrylate) ester, or an acrylate can be used in the form of a homopolymer, a copolymer, or a mixture.

As a matrix for the gel electrolyte, any polymer which absorbs the non-aqueous electrolytic solution to undergo gelation can be used. For example, a fluorine polymer, such as poly(vinylidene fluoride) or poly(vinylidene fluoride-co-hexafluoropropylene), an ether polymer, such as poly(ethylene oxide) or a cross-linked product thereof, or poly (acrylonitrile) can be used. Particularly, from the viewpoint of achieving excellent oxidation-reduction stability, it is desired that a fluorine polymer is used. The matrix containing an electrolytic salt imparts ion conduction properties to the electrolyte.

As the electrolytic salt used in the electrolyte, any electrolytic salt used in the battery of this type can be used. Examples include $LiClO_4$, $LiAsF_6$, $LiPF_6$, $LiBF_4$, $LiB(C_6H_5)_4$, $LiCH_3SO_3$, $LiCF_3SO_3$, LiCl, LiBr and the like.

In the above embodiment, there is shown an example in which each of the current collector for positive electrode and the current collector for negative electrode is in a foil form, but the form of the current collector for positive electrode and the current collector for negative electrode is not limited to the foil form. For example, a net-form current collector for positive electrode or current collector for negative electrode, such as a mesh metal or an expanded metal, may be used.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A cathode active material comprising a mixture of:
    a first cathode active material having a formula: $Li_tCoM_sO_2$, where M represents a metal, $0 \leq s \leq 0.03$, and $0.05 \leq t \leq 1.15$; and
    a second cathode active material having a formula: $Li_xNi_{(1-y-z)}Co_yMn_zA_aO_2$, where A represents a metal, $0.05 \leq x \leq 1.15$, $0.15 \leq y+z \leq 0.70$, $0.05 \leq z \leq 0.40$, and $0 \leq a \leq 0.10$; and where the second cathode material is composed of secondary particles formed from an aggregate of primary particles; and
    wherein the content of the second cathode active material in the cathode active material ranges from about 10% to about 40% by weight.

2. The cathode active material according to 1, wherein: the second cathode active material has a specific surface area that ranges from about 0.2 m²/g to about 1.5 m²/g, both inclusive.

3. The cathode active material according to 1, wherein: the metal M and/or A contains a component selected from the group consisting of magnesium, aluminum and combinations thereof.

4. A non-aqueous electrolyte secondary battery comprising:
a positive electrode and a negative electrode which are electrochemically doped and dedoped with lithium; and
an electrolyte disposed between the positive electrode and the negative electrode;
wherein the positive electrode contains a cathode active material including a mixture of:
a first cathode active material having a formula: $Li_tCoM_sO_2$, where M represents a metal, $0 \leq s \leq 0.03$, and $0.05 \leq t \leq 1.15$;
a second cathode active material having a formula: $Li_xNi_{(1-y-z)}Co_yMn_zA_aO_2$, where A represents a metal, $0.05 \leq x \leq 1.15$, $0.15 \leq y+z \leq 0.70$, $0.05 \leq z \leq 0.40$, and $0 \leq a \leq 0.10$, and where the second cathode material is composed of secondary particles formed from an aggregate of primary particles; and
wherein the content of the second cathode active material in the cathode active material ranges from about 10% to about 40% by weight.

5. The non-aqueous electrolyte secondary battery according to claim 4, wherein:
the second cathode active material has a specific surface area that ranges from about 0.2 m²/g to about 1.5 m²/g, both inclusive.

6. The non-aqueous electrolyte secondary battery according to claim 4, wherein:
the positive electrode has an electrode volume density that ranges from about 3.1 g/cm³ to about 3.7 g/cm³, both inclusive.

7. The non-aqueous electrolyte secondary battery according to claim 4, wherein:
the metal M and/or A contains at least one of magnesium and aluminum.

8. The cathode active material according to 1, wherein:
the mixture of the first and second cathode active materials comprises particles having an average particle size ranging from 2 μm to 30 μm.

9. The non-aqueous electrolyte secondary battery according to claim 4, wherein:
the mixture of the first and second cathode active materials comprises particles having an average particle size ranging from 2 μm to 30 μm.

10. The cathode active material according to 1, wherein:
the first cathode active material includes $Li_tCoO_2$, $Li_tCoAl_sO_2$ and $LiCoMg_sO_2$.

11. The cathode active material according to 1, wherein:
the second cathode active material includes $Li_xNi_{(1-y-z)}Co_yMn_zO_2$ and $Li_xNi_{(1-y-z)}Co_yMn_zAl_aO_2$.

12. The cathode active material according to 1, wherein:
the first cathode active material includes $Li_tCoO_2$, $Li_tCoAl_sO_2$ and $LiCoMg_sO_2$.
the second cathode active material includes $Li_xNi_{(1-y-z)}Co_yMn_zO_2$ and $Li_xNi_{(1-y-z)}Co_yMn_zAl_aO_2$.

13. The non-aqueous electrolyte secondary battery according to claim 4, wherein:
the first cathode active material includes $Li_tCoO_2$, $Li_tCoAl_sO_2$ and $LiCoMg_sO_2$.

14. The non-aqueous electrolyte secondary battery according to claim 4, wherein:
the second cathode active material includes $Li_xNi_{(1-y-z)}Co_yMn_zO_2$ and $Li_xNi_{(1-y-z)}Co_yMn_zAl_aO_2$.

15. The non-aqueous electrolyte secondary battery according to claim 4, wherein:
the first cathode active material includes $Li_tCoO_2$, $Li_tCoAl_sO_2$ and $LiCoMg_sO_2$.
the second cathode active material includes $Li_xNi_{(1-y-z)}Co_yMn_zO_2$ and $Li_xNi_{(1-y-z)}Co_yMn_zAl_aO_2$.

* * * * *